United States Patent
Huber

(10) Patent No.: US 6,425,542 B2
(45) Date of Patent: Jul. 30, 2002

(54) BELT RETRACTOR FORCE LIMITER

(75) Inventor: Andreas Huber, Durlangen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 14 days.

(21) Appl. No.: 09/742,591

(22) Filed: Dec. 21, 2000

(30) Foreign Application Priority Data

Dec. 22, 1999 (DE) ..................................... 299 22 561 U

(51) Int. Cl.⁷ .............................................. B60R 22/28
(52) U.S. Cl. ..................... 242/379.1; 280/805; 280/807
(58) Field of Search ...................... 242/379.1; 280/805, 280/807; 297/471, 472

(56) References Cited

U.S. PATENT DOCUMENTS 5,913,538 A 6/1999 Herpich ....................... 280/805

FOREIGN PATENT DOCUMENTS

| DE | 29614587 | 2/1997 |
|----|----------|--------|
| EP | 0791513  | 8/1997 |

*Primary Examiner*—John Q. Nguyen
(74) *Attorney, Agent, or Firm*—Tarolli, Sundheim, Covell, Tummino & Szabo L.L.P.

(57) ABSTRACT

A force limiter for a seat belt retractor comprising a frame, a belt reel rotatably mounted in the frame and a drum which may be coupled with the belt reel for joint rotation. The force limiter further comprises a plastically deformable metal band that may be wound on the drum with dissipation of energy. The metal band runs through a plurality of deflection elements arranged on the frame to be deformed thereby. At least one of the deflection elements is supported on a supporting structure fixed to the frame and is arranged on the frame so as to be movable transversely to the metal band. The deflection element is provided with a stepped contact surface area for a correspondingly stepped abutment surface area on the supporting structure, whereby, when the supporting structure engages a step of the contact surface area, a retraction movement of the deflection element relative to the metal band is permitted.

10 Claims, 2 Drawing Sheets

BELT RETRACTOR FORCE LIMITER

TECHNICAL FIELD

The invention relates to a force limiter for a seat belt retractor.

BACKGROUND OF THE INVENTION

Force limiters are typically used in a seat belt retractor comprising a frame, a belt reel rotatably mounted in the frame and a drum which may be coupled with the belt reel for joint rotation, and a plastically deformable metal band that may be wound on the drum with dissipation of energy, the metal band running through a plurality of deflection elements arranged on the frame to be deformed thereby. The mode of operation of such a force limiter is based on the fact that a limited rotation of the belt reel in the unreeling direction is permitted in a vehicle crash situation when the belt is loaded beyond a predetermined critical value, the metal band being drawn through the deflection elements and thereby being plastically deformed. The force limiting level is dictated, on the one hand, by the stiffness of the metal band and, on the other, by the geometry of the arrangement of the deflection elements. Prior art proposed defining the force limiting level selectively between at least two values for adapting to the stature data of the occupant. Selection may be done by movement of at least one of the deflection elements. Since this movement of the deflection element occurs against the metal band high positioning forces are needed.

BRIEF SUMMARY OF THE INVENTION

The invention provides a force limiter for belt retractors in which making the selection from a higher to a lower force level requires less driving energy.

In accordance with a first embodiment of the invention this is achieved in a force limiter for a seat belt retractor comprising a frame, a belt reel rotatably mounted in the frame and a drum which may be coupled with the belt reel for joint rotation. The force limiter further comprises a plastically deformable metal band that may be wound on the drum with dissipation of energy. The metal band runs through a plurality of deflection elements arranged on the frame to be deformed thereby. At least one of the deflection elements is supported on a supporting structure fixed to the frame and is arranged on the frame so as to be movable transversely to the metal band. The deflection element is provided with a stepped contact surface area for a correspondingly stepped abutment surface area on the supporting structure, whereby, when the supporting structure engages a step of the contact surface area, a retraction movement of the deflection element relative to the metal band is permitted. The movement of the deflection element occurs initially only transversely to the direction of the supporting force, requiring only friction forces to be overcome, thus a low driving force being sufficient for the movement of the deflection element. As soon as the supporting structure then engages a step of the contact surface area of the deflection element, the deflection element is urged by the effect of the supporting force into its selected position corresponding to the lower force level until it is stopped by the abutment surface area of the supporting structure where it is safely locked in place.

In accordance with a second embodiment of the invention the above object is achieved in a force limiter in which at least one of the deflection elements is supported on a supporting structure which has an abutment surface area and is arranged on the frame so as to be movable substantially parallel to the abutment surface area, the deflection element comprising a stepped contact surface area for the correspondingly stepped abutment surface area, whereby, when the supporting structure engages a step of the contact surface area, a retraction movement of the deflection element relative to the metal band is permitted. In this embodiment of the invention the supporting structure is first moved transversely to the direction of the supporting force or, in other words, substantially parallel to the abutment surface area. Here again only friction forces need to be overcome so that a correspondingly low driving force is sufficient to move the supporting structure. When subsequently the stepped abutment surface area of the supporting structure engages a step of the contact surface area of the deflection element, the deflection element is able to give way under the effect of the supporting force and to move into its selected position corresponding to the lower force level until it is stopped by the abutment surface area of the supporting structure where it is safely locked in place.

The movement of the deflection element in the first embodiment or of the supporting structure in the second embodiment transversely to the direction of the supporting force is implemented preferably by an actuator. Such an actuator may be formed by a pyrotechnic piston/cylinder linear drive, by a solenoid or also by a preloaded spring.

DETAILED DESCRIPTION OF THE PREFERRED EMBODIMENTS

Figure 1:
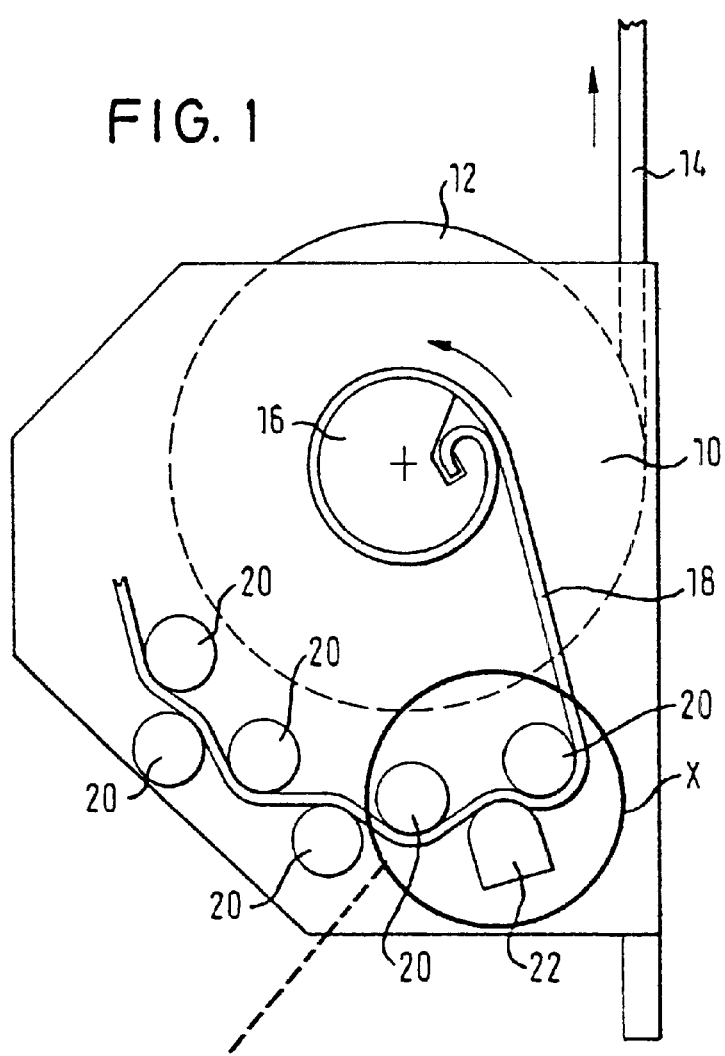
FIG. 1 is a schematic side view to assist in explaining how the force limiter on a belt retractor is configured and works.

Referring now to FIG. 1 there is illustrated a belt retractor including a frame 10 in which a belt reel 12 is rotatably mounted. Wound on the belt reel 12 is the belt webbing 14. The belt reel 12 may be coupled non-rotatably to a drum 16 on which a metal band 18 is wound. The free end of the metal band 18 is guided through several baffle-type deflection elements 20 fixedly arranged on the frame 10 and one deflection element 22 movably arranged on the frame 10. The baffle-type deflection elements 20, 22 form with the metal band 18 and the drum 16, which may be coupled to the belt reel 12, a force limiter. In the course of a vehicle impact the drum 16 is coupled non-rotatably to the belt reel 12. Once the traction in the belt webbing 14 exceeds a predetermined critical value the metal band 18 is pulled through the deflection elements 20, 22, it thereby being plastically deformed and dissipating energy spikes. The force limiting level is dictated by the stiffness of the metal band 18 and the geometry of the baffles formed by the deflection elements 20, 22. In FIG. 1 the deflection element 22 is shown in a starting position corresponding to a higher force limiting level, whereas in FIG. 2 the deflection element 22 is shown in a selected position corresponding to a lower force limiting level in which the deflection element 22 has stepped back from the metal band 18 and distanced itself from the starting position by a spacing S2. Since the metal band 18 now undergoes no plastic deformation at the deflection element 22, less traction is sufficient to pull the metal band 18 through the remaining deflection elements 20.

Figure 2:
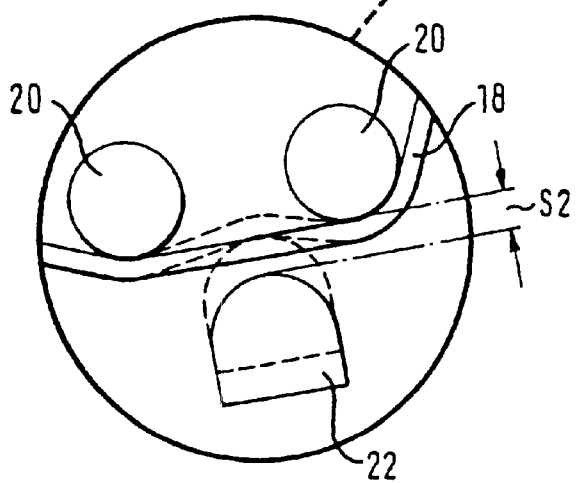
FIG. 2 is a detail taken from FIG. 1 illustrated magnified.
Figure 3:
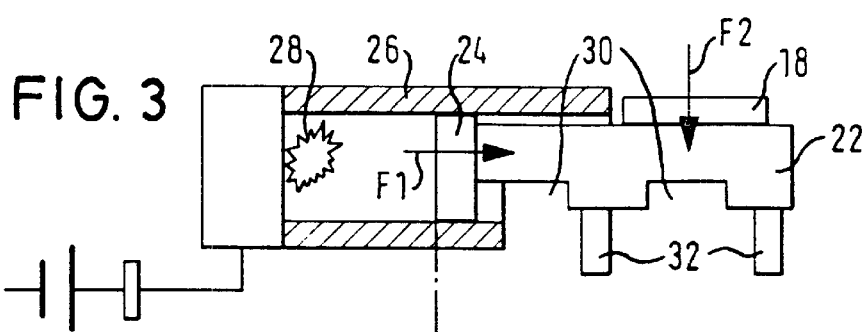
FIG. 3 is a schematic section view through an actuator for a deflection element in a starting position.
Figure 4:
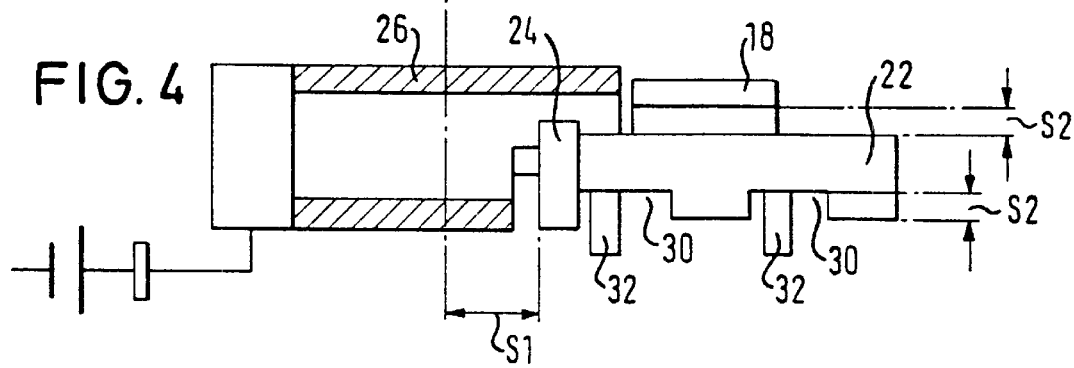
FIG. 4 is a view corresponding to that of FIG. 3 in the switch-over condition.

Referring now to FIG. 3 there is illustrated an embodiment in which the deflection element 22 is integrally coupled to a piston 24. The piston 24 is accommodated in a cylinder 26, at the closed bottom of which a pyrotechnic charge 28 is arranged. The piston 24 forms with the cylinder 26 and the pyrotechnic charge 28 a pyrotechnic piston/cylinder linear drive. At its surface area facing away from the metal band 18 the deflection element 22 comprises a stepped contact surface area having two recesses 30. A supporting structure fixedly arranged on the frame including two supporting elements 32 forms an abutment surface area against which the deflection element 22 abuts with its contact surface area. In the starting position as shown in FIG. 3, the same as shown in FIG. 1, the deflection element 22 abuts against the supporting elements 32 with the steps adjoining the recesses 30. In this position the piston 24 is accommodated in the cylinder 26. By activating an electric igniter the pyrotechnic charge 28 is activated and produces a force F1 which propels the piston 24 from the cylinder 26 to thereby advance the deflection element 22 in the direction of the force F1 perpendicular to the direction of the supporting force F2 with which the metal band 18 is supported by the deflection element 22. The force F1 merely needs to overcome friction forces between the metal band 18 and the deflection element 22 so that a relatively low driving force is sufficient. Due to this advance movement the deflection element 22 attains the selected position as shown in FIG. 4, corresponding to the lower force level to be seen from the situation as shown in FIG. 2. The supporting elements 32 of the supporting structure fixedly arranged on the frame now engage the recesses 30 in the stepped contact surface area of the deflection element 22 so that the latter is able to step back from the metal band 18 and move in the direction of the supporting force F2 until its stepped abutment surface area contacts the abutment surface area of the supporting elements 32. In this position the deflection element 22 is arrested in the recesses 30 due to they being engaged by the supporting elements 32.

Figure 5:
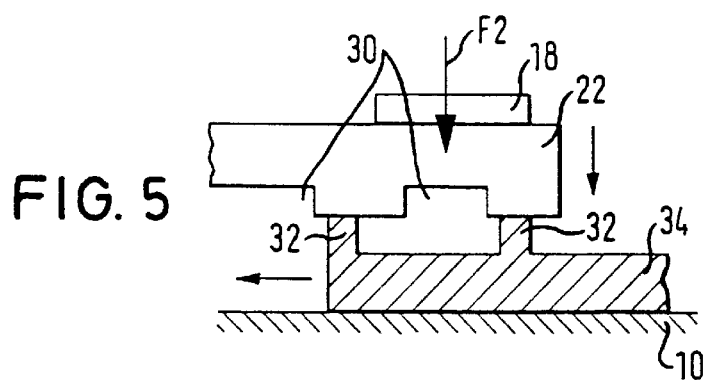
FIG. 5 is a view analogous to that of FIG. 3 but showing a second embodiment.
Figure 6:
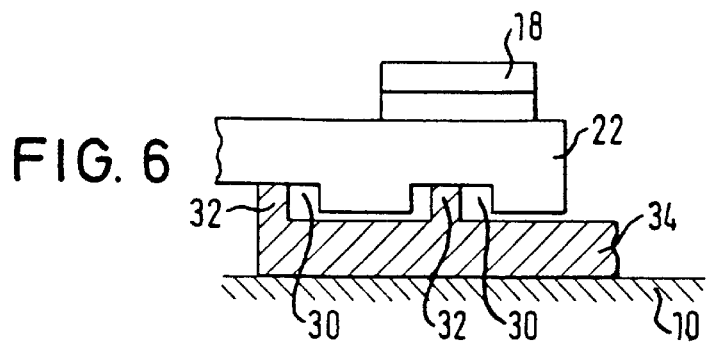
FIG. 6 is a view corresponding to that of FIG. 5 in the switch-over condition.

Referring now to FIGS. 5 and 6 there is illustrated an embodiment based on the same principle as that of the embodiment as shown in FIGS. 3 and 4, except that in this embodiment the supporting elements 32 are not fixedly arranged on the frame but on a supporting structure 34 movably mounted on the frame. The supporting structure 34 is controlled by an actuator, more particularly by a pyrotechnic piston/cylinder linear drive as evident from FIGS. 3 and 4. The deflection element 22 is movably guided only in the direction of the supporting force F2 in the frame 10 of the belt retractor. In this embodiment too, the actuator merely needs to overcome friction forces to move the supporting structure 34 since the movement of the supporting elements 32 is perpendicular to the direction of the supporting force F2.

Activation of the actuator, which in the case of the FIGS. 3 and 4 drives the deflection element 22, and in the case of FIGS. 5 and 6 moves the supporting structure 34, is caused by a sensing system which analyzes individual stature data of the vehicle occupant, more particularly the body weight.

Since only friction forces need to be overcome in moving the deflection element 22 from its starting position into its advanced position, and the movement occurs in a constrained fashion in the direction of the supporting force F2 across the distance S2 through this supporting force F2, only a low actuating force is needed to switch over the force limiter from a higher force level to a lower force level. This thus enables many different variants to be taken into account as the actuator, i.e. in addition to the pyrotechnic version already described, also a solenoid, a preloaded spring as energy storing means, a hydraulic or also a pneumatic actuator.

What is claimed is:

1. A force limiter for a seat belt retractor comprising a frame, a belt reel rotatably mounted in said frame and a drum which may be coupled with said belt reel for joint rotation, and a plastically deformable metal band that may be wound on said drum with dissipation of energy, said metal band running through a plurality of deflection elements arranged on said frame to be deformed thereby, wherein at least one of said deflection elements is supported on a supporting structure fixed to said frame and is arranged on said frame so as to be movable transversely to said metal band, said deflection element being provided with a stepped contact surface area for a correspondingly stepped abutment surface area on said supporting structure, whereby, when said supporting structure engages a step of said contact surface area, a retraction movement of said deflection element relative to said metal band is permitted.

2. The force limiter as set forth in claim 1, wherein said deflection element is movable in a constrained fashion by an actuator substantially parallel to said abutment surface area.

3. The force limiter as set forth in claim 2, wherein said actuator is formed by a pyrotechnic piston/cylinder linear drive.

4. The force limiter as set forth in claim 2, wherein said actuator is formed by a solenoid.

5. The force limiter as set forth in claim 2, wherein said actuator comprises a preloaded spring.

6. A force limiter for a seat belt retractor comprising a frame, a belt reel rotatably mounted in said frame and a drum which may be coupled with said belt reel for joint rotation, and a plastically deformable metal band that may be wound on said drum with dissipation of energy, said metal band running through a plurality of deflection elements arranged on said frame to be deformed thereby, wherein at least one of said deflection elements is supported on a supporting structure which has a stepped abutment surface area and is arranged on said frame so as to be movable substantially parallel to said abutment surface area, said deflection element comprising a stepped contact surface area for a correspondingly stepped abutment surface area, whereby, when said supporting structure engages a step of said contact surface area, a retraction movement of said deflection element relative to said metal band is permitted.

7. The force limiter as set forth in claim 6, wherein said supporting structure is movable in a constrained fashion by an actuator substantially parallel to said abutment surface area.

8. The force limiter as set forth in claim 7, wherein said actuator is formed by a solenoid.

9. The force limiter as set forth in claim 7, wherein said actuator is formed by a pyrotechnic piston/cylinder linear drive.

10. The force limiter as set forth in claim 7, wherein said actuator comprises a preloaded spring.

* * * * *